US006568619B1

(12) United States Patent
Shiga et al.

(10) Patent No.: US 6,568,619 B1
(45) Date of Patent: May 27, 2003

(54) REEL OF MAGNETIC TAPE CARTRIDGE

(75) Inventors: Hideaki Shiga, Kanagawa-ken (JP);
Seiji Tsuyuki, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/831,751

(22) PCT Filed: Nov. 11, 1999

(86) PCT No.: PCT/JP99/06277

§ 371 (c)(1),
(2), (4) Date: May 14, 2001

(87) PCT Pub. No.: WO00/30111

PCT Pub. Date: May 25, 2000

(30) Foreign Application Priority Data

Nov. 12, 1998 (JP) ............................................. 10-322052

(51) Int. Cl.$^7$ ............................................. G11B 23/107
(52) U.S. Cl. ...................... 242/348; 360/132; 242/610.4
(58) Field of Search .................... 242/342, 348, 242/610.6, 610.5, 612, 609, 610.4; 360/132

(56) References Cited

U.S. PATENT DOCUMENTS

| 3,672,594 A | 6/1972 | Selleck et al. |
| 4,083,509 A | 4/1978 | Vasudeva et al. |
| 4,184,650 A | 1/1980 | Nelson et al. |
| 4,296,890 A | 10/1981 | Posso |
| 4,560,114 A | 12/1985 | Schmidts et al. |
| 4,723,731 A | 2/1988 | Posso |
| 4,747,563 A | 5/1988 | Sasaki et al. |
| 4,880,180 A | 11/1989 | Adair |

FOREIGN PATENT DOCUMENTS

| EP | 1 098 321 A1 | 5/2001 |
| JP | 58-57190 | 4/1983 |
| JP | 63-78383 | 5/1988 |
| JP | 5-94643 | 4/1993 |
| JP | 8-111582 | 4/1996 |
| JP | 8-147929 | 6/1996 |
| JP | 11-149748 | 6/1999 |

Primary Examiner—John Q. Nguyen
(74) Attorney, Agent, or Firm—Sughrue Mion, PLLC

(57) ABSTRACT

In the reel of a magnetic tape cartridge, in which the reel with magnetic tape wound thereon is rotatably housed in a cartridge case, a magnetic metal plate is molded integrally on a reel bottom surface by insert molding. The metal plate is formed into an annular shape having a central hole. In a reel bottom wall closing the central hole of the metal plate with resin injected from a gate at the center of the central hole of the metal plate when the insert molding is performed, a recess is formed between a gate trace at the center portion of the bottom wall and an inner peripheral surface of the central hole of the metal plate.

2 Claims, 8 Drawing Sheets

F I G. 9
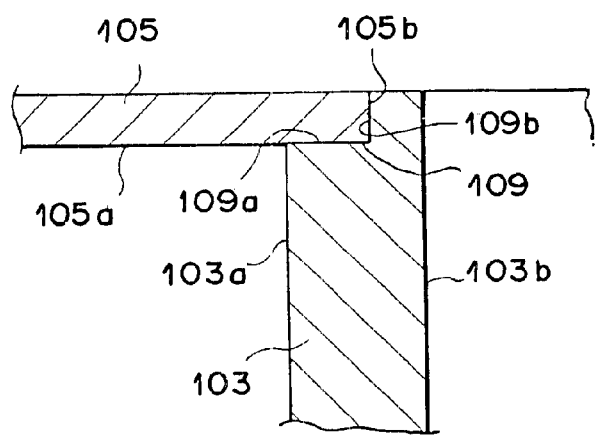

REEL OF MAGNETIC TAPE CARTRIDGE

TECHINICAL FIELD

The present invention relates, in a magnetic tape cartridge where a single reel with magnetic tape wound thereon is rotatably housed within a cartridge case, to the reel of the magnetic tape cartridge.

BACKGROUND ART

In magnetic tape cartridges, which are being used as storage media that are employed in external storage units for computers, etc., there is known a type where a single reel with magnetic tape wound thereon is rotatably housed within a cartridge case. This magnetic tape is employed to archive data for computers, etc. Since important information has been stored, the magnetic cartridge is constructed so that problems, such as tape jamming, etc., do not occur and that the magnetic tape is not pulled out of the cartridge case unexpectedly when not being used, such as when being archived, etc.

The reel is provided with a reel gear which meshes with the driving gear of the rotation means of a cartridge drive mechanism so that it is rotatable and also provided with a magnetic metal plate for keeping the meshed state therebetween.

Hence, when rigidly attaching the aforementioned metal plate to the reel, it is preferable to hold this metal plate to the inside surface of a metal mold and provide the metal plate and the reel integrally by insert molding, because they can be easily manufactured. However, in the insert molding which injects molten resin from a gate provided in the center of the central hole of the annular metal plate, the resin injected under high pressure flows directly to the inner peripheral surface of the central hole of the metal plate. Because of this, there is a possibility that the resin will enter the space between the metal plate and the inside surface of the metal mold and therefore the metal plate cannot be held at a predetermined position in the reel. There is another possibility that in a molded reel product where resin has flowed to the top surface side of the metal plate because of the above-mentioned entrance of resin, it cannot be assured that the metal plate is parallel with the magnet of the rotation means of the cartridge drive mechanism and therefore chucking failure will occur.

If the injecting pressure is reduced to prevent the above-mentioned entrance of resin, a portion insufficiently filled with resin will occur and thus the dimensional precision of the molded produce will be reduced.

The present invention has been made in view of the problems mentioned above. Accordingly, it is a first object of the present invention to provide a reel of a magnetic tape cartridge which can be manufactured by insert molding, without reducing pressure under which resin is injected and without causing resin to enter the space between the metal plate and the inside surface of the metal mold.

The above-mentioned reel, incidentally, is constructed of a cylindrical hub with tape wound on the outer peripheral surface thereof, and flanges extending in disc form from both ends of the hub so that the wound tape is interposed therebetween. Generally, in the case of constituting the reel with resin molded components, one of the two flanges and the hub are molded integrally and the other flange molded as a separate body is rigidly attached to the end portion of the hub.

The rigid attachment between the hub and the flange is usually performed by an ultrasonic welding method using weld bosses or an energy director. The ultrasonic welding shortens manufacturing time, and is low in running cost because a portion melted from a molded component is used as a binder, so ultrasonic welding is now being widely used for manufacturing reels.

Thus, in the rigid attachment of the reel by ultrasonic welding, it is difficult to assure satisfactory attachment precision with enhancements in recording density and recording precision. That is, if data is recorded with high density, the lateral deflection of tape will have an influence on recording and reproducing characteristics. For this reason, the traveling height precision of tape is required to be very strict. In the ultrasonic welding of the hub and the flange which are resin-molded components, however, it is extremely difficult to rigidly attach the flange to the hub at a right angle to the rotation axis of the hub with high precision. Because of this, the development of a high-precision reel has been hastened so that it can satisfactorily meet the high-density recording being required in recent years. In addition, as the recording capacity of the magnetic tape is increased, as described above, the tension of winding a magnetic tape that is wound on the reel becomes greater. Because of this, it is necessary to make the strength of attachment between the hub and the flange stronger.

The aforementioned problems with the ultrasonic welding will be described in detail. Rigid attachment type reels are shown in FIG. 10 and FIGS. 11 and 12. The example of FIG. 10 is a type in which the longitudinal end portions of magnetic tape are respectively fixed to two reels housed in the cartridge case and the magnetic tape is wound from one of the reels onto the other. In the reel, a hub 153 formed integrally with one flange 154, and another flange 155 formed as a separate body, are connected together by ultrasonic welding. Within the cylindrical hub 153 with an outer peripheral surface on which magnetic tape is wound, six weld bosses 156 protruding in a direction parallel to the rotation axis of the hub 153 are provided at regular intervals in the circumferential direction. On the other hand, at positions corresponding to the weld bosses 156, a disc flange 155 has transmission holes 157 into which the weld bosses 156 are inserted. The flange 155 is placed on the hub 153 so that the upper ends of the weld bosses 156 inserted into the transmission holes 157 project from the flange 155. Then, with the annular tip end surface of a welding horn pressed against the upper end portions of the weld bosses 156, ultrasonic waves are applied to the upper portions of the weld bosses 156 to melt the weld bosses 156. The melted weld bosses 156 are flattened so that the flange 155 is rigidly attached to the hub 153.

Similarly, in the reel shown in FIGS. 11 and 12, a hub 153 formed integrally with one flange 154, and another flange 155 formed as a separate body, are connected together by ultrasonic welding. Within a cylindrical hub 153, three weld bosses 158 are provided at regular intervals in the circumferential direction. A disc flange 155 has transmission holes 159 into which the weld bosses 158 are inserted. As with the aforementioned, the flange 155 is placed on the hub 153 so that the weld bosses 158 are inserted into the transmission holes 159. Then, the upper end portions of the weld bosses 158 are melted and flattened with the 3-point annular tip end surface of a welding horn so that the flange 155 is rigidly attached. Note that the above-mentioned weld bosses 156 and 158 may be welded by heating.

In the rigid attaching by the weld bosses 156 and 158, however, pushing force will remain exerted on the central portion of the attached flange 155 and deform the flange 155, if the welding by the welding horn is too strong. If the welding is too weak, the flange 155 will not be satisfactorily attached due to underwelding of the weld bosses 156 and 158 and chatter of the flange 155 against the hub 153 will occur. Furthermore, if a plurality of weld bosses 156 and 158 are unequally welded, a warp will develop in the flange 155. If such a reel rotates, deflection of the flange 155 will occur and accordingly deflection of the magnetic tape will occur. Thus, it is difficult to manage welding conditions suitably.

FIGS. 13 and 14 show a rigid attachment type reel having an energy director. A flat fixing portion 160 in the form of a ring is formed in an end surface near the outer peripheral surface of a cylindrical hub 153 on which magnetic tape is wound. At the inner peripheral surface of a disc flange 155, a generally triangular cross-section energy director is formed to protrude in ring form from the flange surface. The flange 155 is placed on the hub 153, and with the flange 155 on the energy director 161 pressed against the annular tip end surface of a welding horn, ultrasonic waves are applied so that the energy director 161 is melted and rigidly attached to the hub 153.

In the rigid attaching by the energy director 161, however, it is difficult to weld the energy director 161 uniformly over the entire circumference. If the degree that the energy director 161 is melted varies over the circumference, the flange 155 will tilt and therefore deflection will occur during rotation. Also, since the energy director 161 is melted by concentrating ultrasonic energy on the energy director 161 without contacting the welding horn directly with the energy director 161, the design of the energy director 161 for melting into a suitable state and the setting of ultrasonic welding conditions are complicated and difficult.

In addition, there are resins that cannot be welded by the aforementioned ultrasonic welding, so the number of usual resins is limited. Furthermore, the ultrasonic welding has the following disadvantages: the wall thickness of the hub is increased to assure weld surfaces; wall thickness becomes unequal between the flange and the hub which are integrally formed; flatness of the flange portion is reduced; and cylindricity of the hub is reduced.

The present invention has been made in view of the points described above. Accordingly, it is a second object of the present invention to provide a reel that is capable of enhancing rigid attachment precision between the hub and the flange even whey they are resin molded components, and reducing tape deflection.

DISCLOSURE OF THE INVENTION

To achieve the above-mentioned first object of the present invention, there is provided a single reel of a magnetic tape cartridge in which the reel with magnetic tape wound thereon is rotatably housed in a cartridge case, a magnetic metal plate being molded integrally on a reel bottom surface by insert molding;

the metal plate being formed into an annular shape having a central hole; and in a reel bottom wall closing the central hole of the metal plate with resin injected from a gate at the center of the central hole of the metal plate when the insert molding is performed, a recess being formed between a gate trace at the center portion of the bottom wall and an inner peripheral surface of the central hole of the metal plate.

It is preferable that the recess be formed into the shape of a circumferential groove by an annular protruding portion provided in a metal mold.

According to the reel of the present invention achieving the first object of the present invention, when the magnetic metal plate with a central hole is molded integrally on the bottom surface of the reel by insert molding, a recess is formed in the reel bottom wall closing the central hole of the metal plate with resin, between a gate trace at the center portion of the bottom wall and an inner peripheral surface of the central hole of the metal plate. For this reason, a protruding portion is formed in the metal mold so that it corresponds to the recess. The resin, injected from the gate during insert molding, is regulated so as to flow in a relatively thin space for molding the reel bottom wall, by the protruding portion of the metal mold. As a result, the resin flows to the inside surface of the metal plate without colliding directly with the inner peripheral surface of the metal plate, and the metal plate is pushed against the metal mold surface. Therefore, the reel of the present invention has the following advantages: the entrance of resin into the space between the metal plate and the inside surface of the metal mold can be prevented; the metal plate is not moved; the injection pressure can be set higher; the molding precision of the reel can be assured; and desired insert molding can be performed.

In accordance with the second object of the present invention, there is provided a reel of a magnetic tape cartridge in which a disc flange is rigidly attached to an end portion of a cylindrical hub having an outer peripheral surface on which tape is wound, the hub end portion and the flange being rigidly attached by an adhesive.

It is preferable that the adhesive be a light hardening type adhesive and further preferable that it be an ultraviolet ray hardening type adhesive or visible light hardening type adhesive.

It is desirable that the hub and the flange be rigidly attached at a position away from the outer peripheral surface of the hub by the adhesive. In that case, it is preferable that the hub and the flange be rigidly attached at a surface approximately parallel to the axis of rotation of the hub by the adhesive. The surface may be inclined at an angle of 1 to 10 degrees. Furthermore, the hub and the flange may be rigidly attached at a surface perpendicular to the rotation axis of the hub. For instance, a collar portion which contacts with the inner peripheral surface of the hub is provided in the flange, and the inner peripheral surface of the hub and the outer peripheral surface of the collar portion are rigidly attached by an adhesive.

The end surface of the hub may be provided with a stepped portion. In this case, it is preferable that the hub and the flange be rigidly attached by the adhesive at a portion of the hub which is radially inward from the stepped portion.

It is preferable that at least either an adhesion surface of the hub or an adhesion surface of the flange be roughened and rigidly attached by an adhesive.

The aforementioned adhesive is applied to a predetermined place on the adhesion surface of the hub or flange in a predetermined amount by a dispenser, etc. The flange is assembled on the hub, while being positioned with respect to the hub. Then, they are rigidly attached by hardening the adhesive.

According to the reel of the magnetic tape cartridge of the present invention achieving the second object of the present invention, the disc flange is rigidly attached to the end portion of the cylindrical hub having an outer peripheral surface on which tape is wound, by the adhesive. As a result, the reel of the present invention has the following advantages: dimensional precision can be satisfactorily obtained by rigidly attaching the flange at a right angle to the axis of rotation and to the degree that deformation does not occur; the lateral deflection of tape can be reduced; and it can satisfactorily meet enhancements in recording density and recording precision, even if the hub and the flange are resin-molded components.

If a light hardening type adhesive, particularly an ultraviolet ray hardening type adhesive, is used as the aforementioned adhesive, a reduction in the hardening time makes mass production and step simplification possible.

In the reel, in which the hub and the flange are rigidly attached by an adhesive at a position away from the outer peripheral surface of the hub, for example, at a surface approximately parallel with the axis of rotation of the hub, or at a portion of the hub which is radially inward from the stepped portion, the aforementioned adhesive can be prevented from overflowing to the outer peripheral surface of the hub on which tape is wound.

If at least either an adhesion surface of the hub or an adhesion surface of the flange is roughened and rigidly attached by an adhesive, this reel can enhance adhesive strength and allow an increase in winding tension.

In addition, the use of resin enables a combination of a resin hub and a resin flange, having no weldability, which cannot be welded by ultrasonic welding. In the ultrasonic welding, the flatness of the hub due to unevenness in wall thickness between the hub and the flange which are integrally formed, and cylindricity of the flange portion, are reduced because of assurance of adhesion surfaces. However, in the present invention, molding is possible with equal wall thickness; molding precision of the hub is enhanced; and a reel of a magnetic tape cartridge with higher precision is obtainable.

BRIEF DESCRIPTION OF THE DRAWINGS

FIG. 9 is an enlarged view of the essential part of FIG. 8;

BEST MODE FOR CARRYING OUT THE INVENTION

Figure 1:
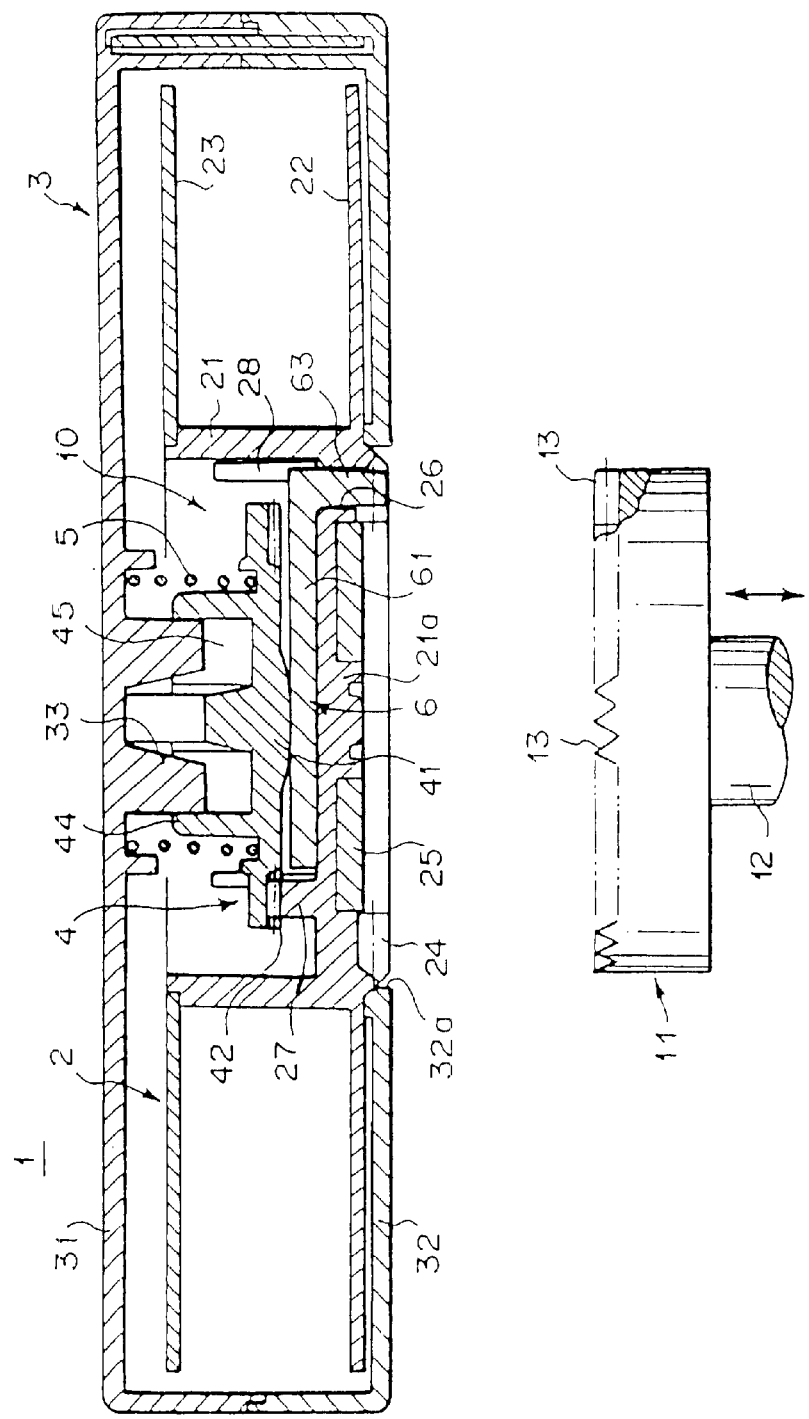
FIG. 1 is a sectional front view showing the non-operative state of a magnetic tape cartridge having a reel according to a first embodiment of the present invention.
Figure 2:
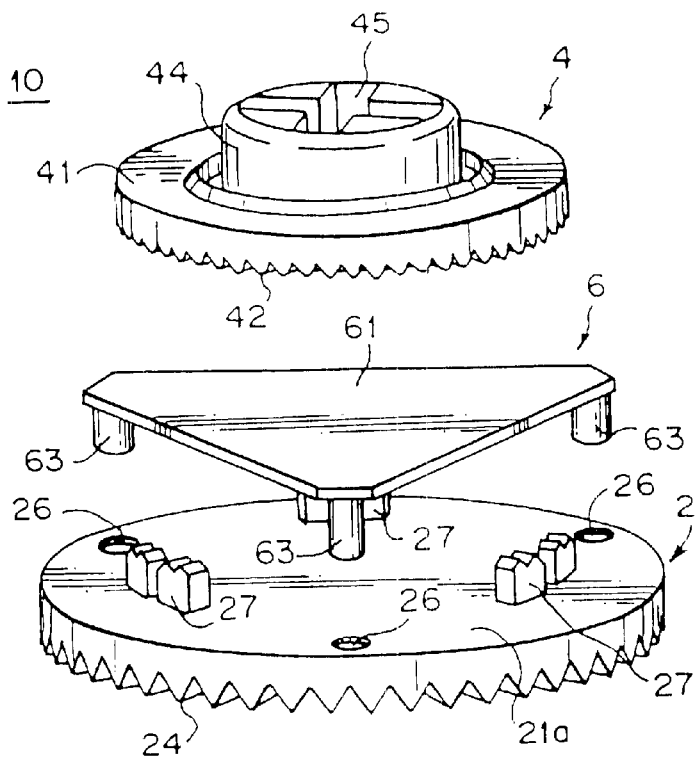
FIG. 2 is an exploded perspective view of the essential arts of the magnetic tape cartridge of FIG. 1.
Figure 3:
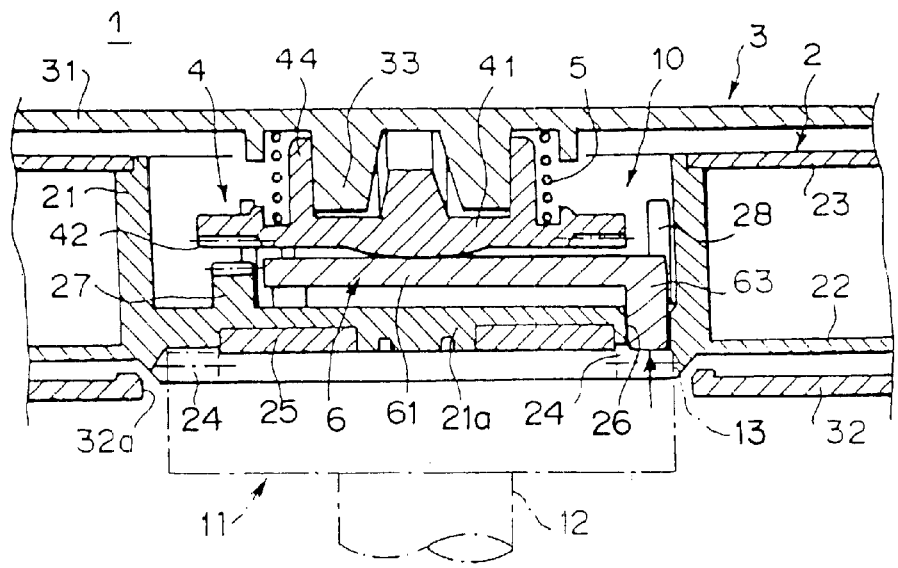
FIG. 3 is a part-sectional view showing the operative state of the magnetic tape cartridge of FIG. 1.

A first embodiment of the present invention achieving the aforementioned first object of the present invention will hereinafter be described in detail with reference to the drawings. FIG. 1 is a sectional front view showing the non-operative state of a magnetic tape cartridge having a reel according to the first embodiment of the present invention. FIG. 2 is an exploded perspective view of the essential parts of the magnetic tape cartridge of FIG. 1, and FIG. 3 is a part-sectional view showing the operative state of the magnetic tape cartridge of FIG. 1.

The magnetic cartridge 1 is constructed so that a single reel 2 with magnetic tape (not shown) wound thereon is rotatably housed within a cartridge case 3. The cartridge case 3 is formed by fastening an upper case 31 and a lower case 32 together with small screws, etc. The lower case 32 is provided at a center portion thereof with an opening 32a.

The reel 2 consists of a bottomed cylindrical hub 103, in which magnetic tape is wound on the outer periphery, and upper and lower flange portions 22 and 23 respectively projected in disk form in the radial direction from the upper and lower ends of the outer periphery of this hub 103. The hub 103 and the lower flange portion 22 are integrally formed from synthetic resin and are united with the flange 105 by ultrasonic welding, adhesion, etc. The hub 103 is closed at a lower portion thereof by a bottom wall 21a. The radially outer portion of the bottom surface of the bottom wall 21a has an annular reel gear 24 that drives the reel 2 to rotate. The radially inner portion, inside the reel gear 24, of the bottom wall 21a has an annular, magnetic metal plate 25 attached integrally by insert molding. The reel gear 24 and plate 113 of the reel 2 are disposed to face the opening 32a in the bottom surface of the cartridge case 3.

In addition, rotation means 11 provided on a driving side includes a rotating shaft 12, which is provided on the upper end face thereof with an annular driving gear 13 and a magnet (not shown). With the chucking operation of the rotation means 11, the magnetic tape cartridge 1 loaded into a bucket (not shown) on the driving side is lowered toward the rotating shaft 12. Also, the driving gear 13 meshes with the reel gear 24. The magnet attracts the plate 113, thereby maintaining the meshed state between the driving gear 13 and the reel gear 24.

Note that the above-mentioned magnetic tape cartridge is equipped with reel-rotation retraining means 10 which allows rotation of the reel 2 in the operative state and restricts the rotation in a non-operative state. This reel-rotation restraining means 10 has a restraining member 4 movable toward or away from the reel 2 in an up-and-down direction, an urging member 5 for urging the restraining member 4 in a restraining direction, and an unlocking member 6 for moving the restraining member 4 in an unlocking direction.

3 (three) through holes 26 which penetrate the reel gear 24 in the up-and-down direction are disposed in the bottom wall 21a of the reel 2 at regular intervals on a circle. Furthermore, at positions different in phase from the through holes 26, three pairs of stopper protrusions (i.e., six stopper protrusions) 27 are erected in the top surface of the bottom wall 21a at regular intervals on a circle. The upper end of each stopper protrusion 27 is formed into a gear tooth shape. Note that three or more through holes 26 and three or more pairs of stopper protrusions 27 may be disposed. Also, the upper end of the stopper protrusion 27 may be formed into the shape of a single gear tooth. In the reel 2 shown in FIG. 2, only the part of the bottom wall 21a cut away from the reel 2 is shown.

The restraining member 4 has a disc portion 41, which is disposed within the hub 103 of the reel 2 so that it faces the bottom wall 21a. The radially outer portion of the bottom surface of the disc portion 41 has an annular restraining gear 42 that is meshable with the upper ends of the stopper protrusions 27. In addition, the center portion of the bottom surface of the disc portion 41 is projected into a convex shape and contacts the center portion of the top surface of the disc portion 61 of the unlocking member 6 that is to be described later.

Furthermore, a protruding portion 44 extends upward from the top surface of the disc portion 41 of the restraining member 4. This protruding portion 44 is provided with a stopper groove 45 in the form of a cross, the groove 45 extending in the up-and-down direction. On the other hand, a swivel stopping protrusion 33 that is inserted into the stopper groove 45 is erected in the inner surface of the upper case 31 of the cartridge case 3. The restraining member 4 is disposed so as to be movable in the up-and-down direction without rotating, with the stopper groove 45 engaged by the swivel stopping protrusion 33. Note that the stopper groove 45 may be provided in the form of a straight line.

Between the top surface, outside the protruding portion 44 of the restraining member 4, of the disc portion 41 and the inner surface, outside the swivel stopping protrusion 33, of the upper case 31, the urging member 5 such as a coil spring is compressed so that the restraining member 4 is urged downward in the restraining direction where the restraining gear 42 and the stopper protrusion 27 engage with each other.

In addition, the unlocking member 6 is interposed between the restraining member 4 and the bottom wall 21a of the hub 103 so that it is movable up and down. The bottom surface near the vertices of the generally triangular plate base 61 of the unlocking member 6 is provided with cylindrical pushing-up portions 63 that extend in the up-and-down direction. The pushing-up portions 63 are inserted into the through holes 26 bored in the bottom wall 21a of the reel 2 so that they are movable into and out of the through holes 26, respectively. The lower ends of the pushing-up portions 63 are located to face the tooth portion of the reel gear 24 of the bottom surface of the reel 2. With the pushing-up portions 63 inserted into the through holes 26, each pair of the stopper protrusions 27 is located between two adjacent arm portions 62 and outside the plate base 61. Furthermore, guide members 28 in the form of a rib are disposed on the inside wall, near the through holes 26, of the hub 103 in order to guide the vertexes of the unlocking member 6 when inserting the pushing-up portions 63 of the unlocking member 6 into the through holes 26. Note that the pushing-up portion 63 may be formed into the shape of a square pillar, an elliptical cylinder, etc.

When the unlocking member 6 (FIG. 1) is situated at the lowermost position (FIG. 1), the lower end face of the pushing-up portion 63 is situated at approximately the tooth edge position of the reel gear 24. As the driving gear 13 is meshed with the reel gear 24 by the chucking operation of the rotation means 11, the unlocking member 6 is pressed by the driving gear 13 and is pushed up by a predetermined amount of stroke (FIG. 3). The unlocking member 6 is also rotated integrally with the reel 2 by the fit of the pushing-up portions 63 into the through holes 26. In addition, since the lower end of the central convex portion of the bottom surface of the restraining member 4 is urged to abut the top surface of the unlocking member 6 by the urging member 5, they are brought into sliding contact with each other upon rotation of the reel 2.

Figure 4A:
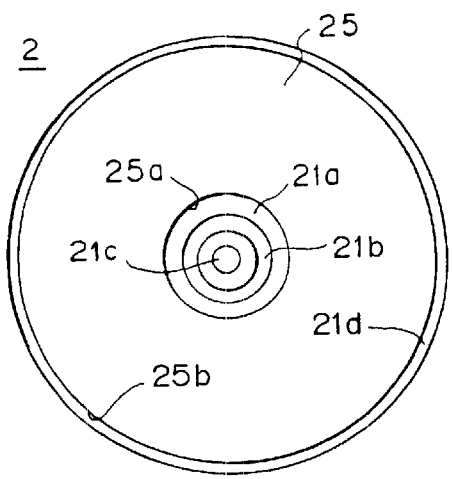
FIG. 4A is a bottom view of the essential part of the reel of the magnetic tape cartridge of FIG. 1.
Figure 4B:
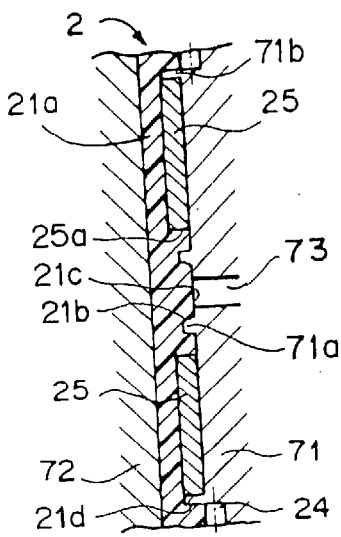
FIG. 4B is a sectional view of the injection-molded state of the reel of the magnetic tape cartridge of FIG. 1.

FIG. 4A shows a bottom view of the metal plate 25 of the central portion of the bottom surface of the reel 2 and FIG. 4B a sectional view of the molded state. The metal plate 25 is formed into an annular shape having a central hole 25a. In the molded state of FIG. 4A where the plate 113 has been inserted into the bottom wall 21a of the reel 2, the part of the central hole 25a is closed by the resin of the bottom wall 21a; a recess 21b in the form of a circumferential groove is formed in the bottom wall 21a closing the central hole 25a; a gate trace 21c to be described later is formed in the center portion of the bottom wall 21a; a gap 21d in the form of a circumferential groove is formed outside the outer peripheral surface 25g of the metal plate 25; and the reel gear 24 is provided outside the circumferential gap 21d.

Figure 5:
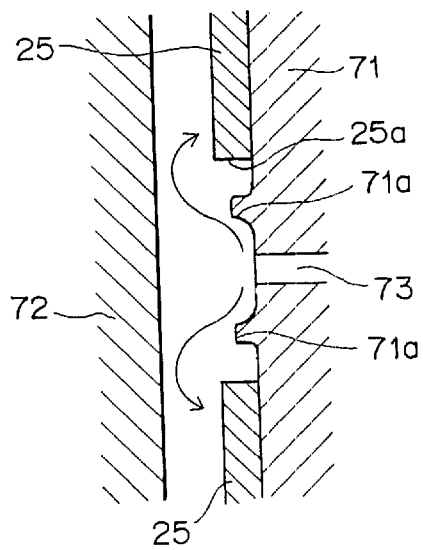
FIG. 5 is a part-sectional view showing how the reel of the magnetic tape cartridge of FIG. 1 is molded by injecting resin.

As shown in FIG. 4B and FIG. 5, the reel 2 is molded by injecting resin into a cavity formed by a stationary metal mold 71 and a movable metal mold 72, through a gate 73. The gate 73 is formed in the center portion of the stationary metal mold 71. Outside the gate 73, an annular protruding portion 71a is formed to protrude into the cavity. The outer peripheral surface 25g of the plate 113 is fitted into the an annular protruding portion 71a of the metal mold 71 so that the inner peripheral surface of the central hole 25a of the metal plate 25 is positioned outside the annular protruding portion 71a. In this manner, the metal plate 25 is held in a predetermined position on the inside surface of the metal mold 71. Then, the movable metal mold 72 is closed and resin is injected.

In the reel 2 after molding, the circumferential recess 21b that results from the protruding portion 71a is formed in the part of the bottom wall 21a closing the central hole 25a of the metal plate 25, as previously described. In addition, the gate trace 21c that results from the gate 73 is formed in the center portion of the reel 2. Furthermore, the gap 21d in the form of a circumferential groove which results from the hold trace of a ring protrusion 71b is formed in the outer peripheral portion of the reel 2.

If insert molding is performed with the plate 113 held by the metal mold 71 having the annular protruding portion 71a at the outer periphery of the gate 73, the resin which is injected from the gate 73 will be regulated so as to flow toward the inside surface of the movable metal mold 72 by the protruding portion 71a, as shown by arrows in FIG. 5. For this reason, the resin flows to the inside surface of the metal plate 25 through the protruding portion 71a without colliding directly with the inner peripheral surface of the central hole 25a of the metal plate 25. That is, the resin flows so that the metal plate 25 is pushed against the inside surface of the stationary metal plate 71. This can prevent the resin from entering the contact surface between the metal plate 25 and the stationary metal mold 71. As a result, the metal plate 25 can be rigidly attached at a predetermined position on the reel 2. Note that it is preferable to form the inner peripheral surface of the protruding portion 71a into the shape of a curved surface.

In addition, if insert molding is performed with the outer peripheral surface of the plate 113 held by the ring protrusion 71b, the plate 113 can be prevented from moving and shifting out of position because of the flow of resin. Furthermore, because of formation of the gap 21d, the shrinking force resulting from the shrinkage of resin after insert molding will not act on the outer peripheral surface 25b of the metal plate, so deformation of the plate 113 can be suppressed.

Note that the protruding portion 71a, that is, the recess 21b in the reel 2, does not need to be continuous in ring form. The protruding portion 71a may be formed partially in the reel 2, as long as the main flow of resin flows to the inside surface of the metal plate 25 through the discontinuous protruding portion 71a.

Now, second and third embodiments of the present invention achieving the aforementioned second object of the present invention will be described in detail with reference to the drawings.

Figure 6:
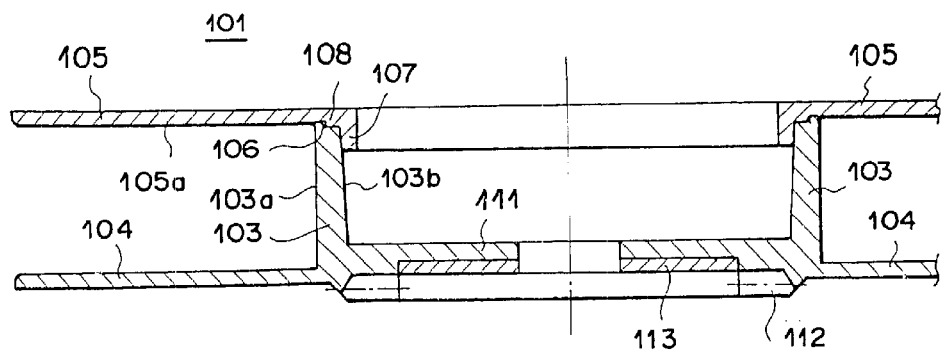
FIG. 6 is a sectional view of a reel of magnetic tape cartridge according to a second embodiment of the present invention.
Figure 7:
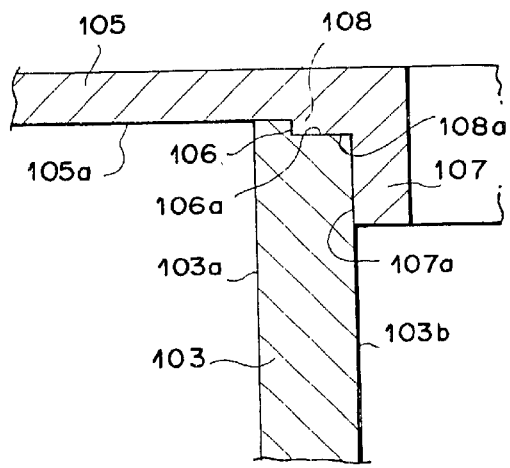
FIG. 7 is an enlarged view of the essential part of FIG. 6.

FIG. 6 is a sectional view of the reel of the magnetic tape cartridge according to the second embodiment of the present invention. FIG. 7 is an enlarged view of the essential part of FIG. 6.

The reel 1 has a cylindrical hub 103 in which magnetic tape is wound on the outer peripheral surface 103a, and a flange portion 22 projecting in disk form from the outer periphery of one end portion (in the figure, lower end portion) of the hub 103 in the radial direction. The cylindrical hub 103 and the flange portion 104 are integrally formed from synthetic resin. A flange 105 in the form of a disc, formed as a separate body by synthetic resin, is rigidly attached to the other end portion of the hub 103 by an adhesive.

The inner peripheral portion of the hub 103 is continuous to a disc-shaped inner wall 111. The outside surface of the inner wall 21a has an annular reel gear 112 for rotating the reel 101. Furthermore, on the radially inner side from this real gear 112, an annular metal plate 113 for magnetic attraction is inserted when molded.

Moreover, the end surface of the hub 103, to which the flange 105 is rigidly attached, has a stepped portion 106, recessed in ring form so that a portion on the side of the inner peripheral surface 103b becomes lower in height, as shown in FIG. 7. Also, the end surface 106a of the stepped portion 106 in the hub 103 and the end portion of the hub inner peripheral surface 103b become adhesion surfaces.

On the other hand, the flange 105 has a circular opening at the central portion thereof. At the circumferential margin of the opening, a collar portion 107 is formed to project in a direction perpendicular to the flange surface 105a. As shown in FIG. 7, the corner portion between the collar portion 107 and the flange surface 105a is formed into an annular protruding portion 108 which fits on the stepped portion 106 of the hub 103. The end surface 108a (which is parallel with the flange surface 105a) of the annular protruding portion 108 in the flange 105 and the outer peripheral surface 107a of the collar portion 107 become adhesion surfaces.

The adhesion between the hub 103 and the flange 105 is performed in the following manner. A predetermined amount of adhesive is supplied to the adhesion surface of the hub 103 and/or the adhesion surface of the flange 105 by supply means such as a dispenser, etc. While the two surfaces are being positioned, the collar portion 107 of the flange 105 is fitted onto the inner peripheral surface 103b of the hub 103, and the annular protruding portion 108 is fitted and assembled on the stepped portion 106. Then, the outer peripheral surface 107a of the flange collar portion 107 and the inner peripheral surface 103b of the hub 103 are joined at a surface parallel (or may be inclined at an angle of about 1 to 100°) to the axis of rotation of the hub 103. Furthermore, the end surface 108a of the annular protruding portion 108 and the end surface 106a of the stepped portion 106 are joined at a surface perpendicular to the rotation axis of the hub 103.

As the adhesive, a wide variety of adhesives are usable. However, it is preferable to use a light hardening type adhesive, particularly an ultraviolet ray hardening type adhesive or a visible light hardening type adhesive. In the case of the light hardening type adhesive, the adhesive is applied to an adhesion surface and then hardened by irradiating light (ultraviolet ray, visible light) for a predetermined time period (e.g., for 5 sec). In this manner, the adhesion process ends.

The ultraviolet ray hardening type adhesive uses, for example, a known adhesive which has an acryloyl group to a few acryloyl groups as a functional group and also which has a composition that makes a radical polymerization reaction with a photo polymerized monomer, etc., by ultraviolet rays and is bridged and polymerized. For instance, there are 3-BONDs 3062, 3055, and 3065 (3-Bond), ALONE-TIGHTs BU-130U, BU-230U, and BU-249U (Toagosei), etc. The aforementioned ultraviolet ray hardening type adhesive may be equipped with a given hardening property such as an aerobic hardening, primer hardening, etc. These adhesives are hardened in a few seconds to tens of seconds when irradiated with ultraviolet rays of wavelength 200 to 400 nm. In this case it is preferable to mold the flange 105 or hub 103 with transparent resin such as polycarbonate (PC), polystyrene (PS), etc. However, resin does not always need to be transparent, because there is a type in which adhesion surfaces are combined together after irradiation of ultraviolet rays.

As a visible light hardening type adhesive, there are ALONE-TIGHTs VL-1303, VL-2303, and VL-5303 (Toagosei), etc. These are adhesivable even when the flange 105 or hub 103 is semitransparent or slightly colored.

In the above-mentioned second embodiment, in order to enhance adhesive strength by an adhesive, at least one of the adhesion surfaces in the adhesion portion between the end surface 106a of the stepped portion 106 of the hub 103 and the end surface 108a of the annular protruding portion 108 of the flange 105, and/or at least one of the adhesion surfaces in the adhesion portion between the end portion of the inner peripheral surface 103b of the hub 103 and the outer peripheral surface 107a of the collar portion 107 of the flange 105, is roughened as occasion demands. The adhesion surface roughening is obtained by roughening the surface of the adhesion-surface molding portion of the metal mold for the hub 103 or flange 105, and it is preferable that the surface roughness be 1 $\mu$m or more in terms of Rz.

According to the second embodiment of the present invention, the hub 103 and the flange 105 are joined by an adhesive. As a result, the second embodiment has the following advantages: they can be uniformly adhered over the whole periphery without giving rise to deformation in the flange 105; the tape reel 101 after rigid attachment can be formed with dimensional precision corresponding to molding precision; the flange 105 can be rigidly attached perpendicular to the rotation axis of the hub 103; the rotational deflection of the flange 105 is slight when the tape reel 103 is being rotated to forward or rewind magnetic tape; the lateral fluctuation in magnetic tape being transported is also slight and satisfactory positional precision is obtained; the influence on the recording and reproducing characteristics is slight; and the high-density requirement can be met.

In addition, the adhesion between the hub 103 and the flange 105 is performed at a position, away from the outer peripheral surface 103a of the hub 103, and on the radially inner side from the stepped portion 106. As a result, the adhesive is prevented from overflowing from the adhesion surface to the part of the outer peripheral surface 103a, and the influence of the adhesive on the magnetic tape that is wound on this outer peripheral surface 103a can be eliminated.

Furthermore, if the adhesion surface is roughened, the adhesion area to which an adhesive is applied is increased and the adhesive strength is enhanced. As a result, the adhesion between the hub 103 and the flange 105 can be more rigidly performed, and the roughened adhesion surface can endure an increase in the winding tension without increasing the adhesion area.

Although, in the above-mentioned second embodiment, adhesion is performed at two surfaces perpendicular to each other in order to obtain high adhesive strength, at least the adhesion between the outer peripheral surface 107a of the collar portion and the hub inner peripheral surface 103b is necessary.

Figure 8:
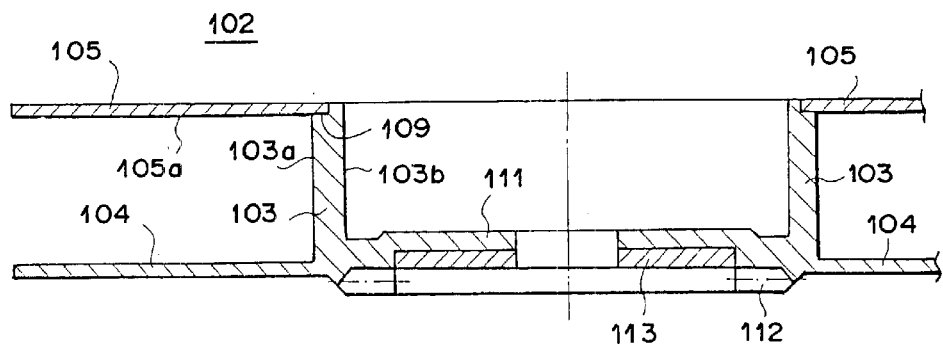
FIG. 8 is a sectional view of a reel of magnetic tape cartridge according to a third embodiment of the present invention.
Figure 10:
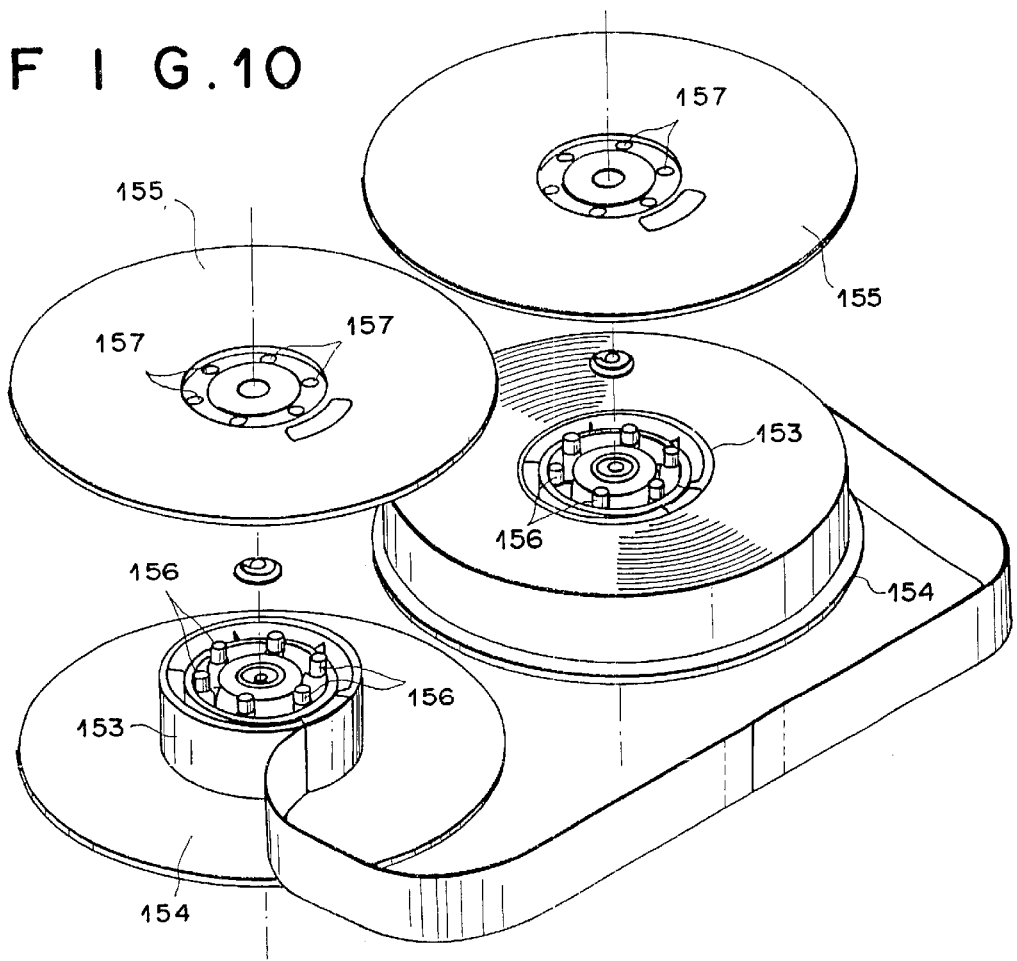
FIG. 10 is an exploded perspective view showing a conventional structure for rigidly attaching the reel of a magnetic tape cartridge.
Figure 11:
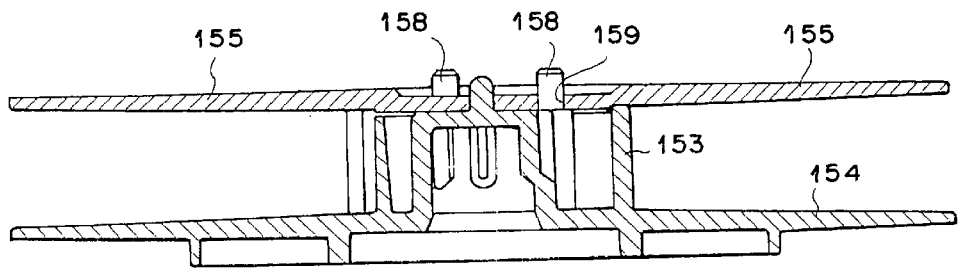
FIG. 11 is an exploded perspective view showing another conventional structure for rigidly attaching the reel of magnetic tape cartridge.
Figure 12:
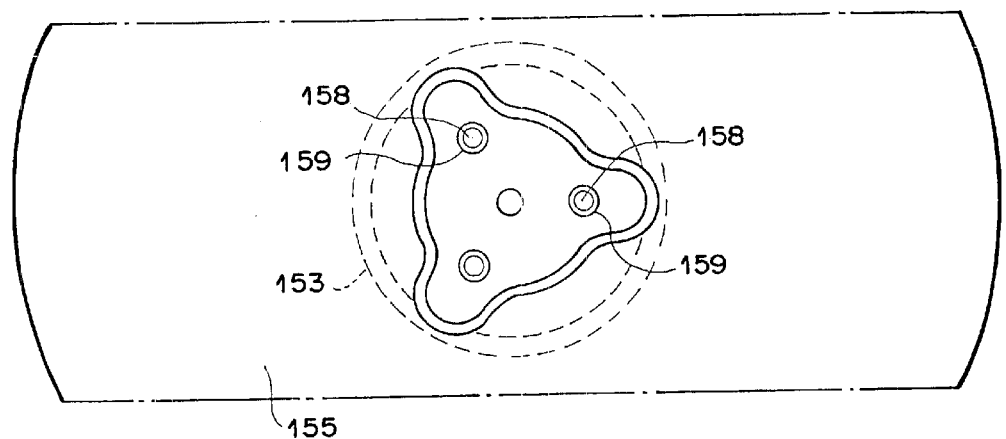
FIG. 12 is a plan view of the essential parts of FIG. 11.
Figure 13:
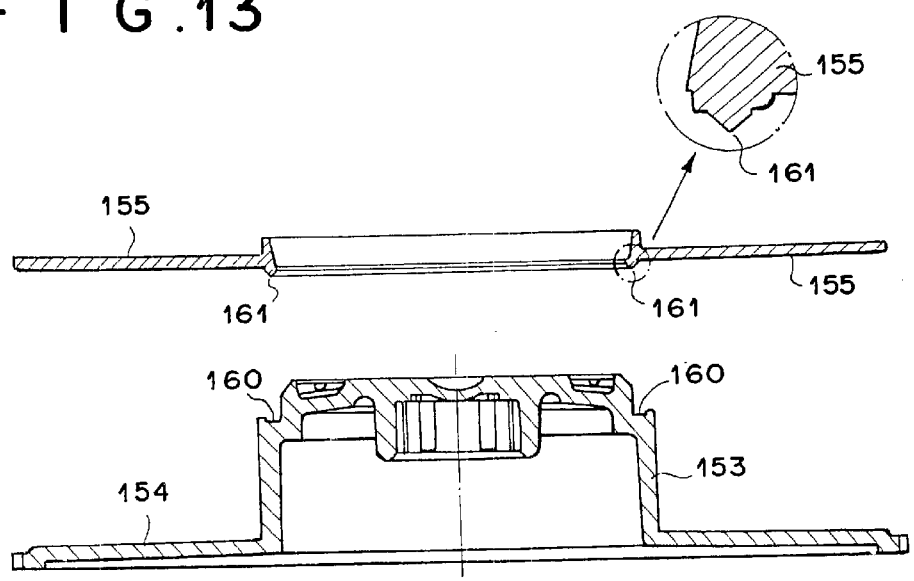
FIG. 13 is an exploded perspective view showing still another conventional structure for rigidly attaching the reel of magnetic tape cartridge, the state before rigid attachment having been shown.
Figure 14:
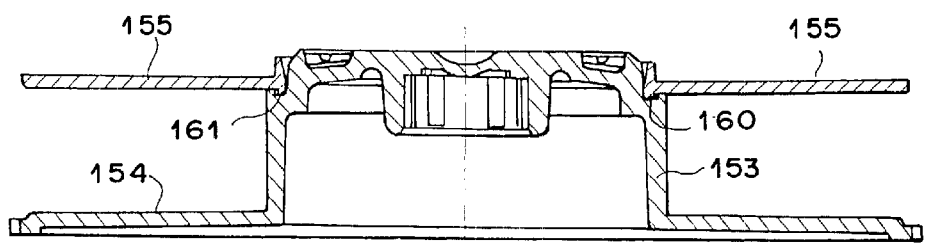
FIG. 14 is a sectional view showing the state in which the reel of FIG. 13 is rigidly attached

FIGS. 8 and 9 show a tape reel 102 of a third embodiment of the present invention which have achieved the aforementioned second object of the present invention. The adhesion portion of the third embodiment differs in shape from that of FIG. 6 and the other parts are provided in the same manner as FIG. 6.

The end surface of the hub 103 where the flange 105 is rigidly attached has an annular recess 109, formed so that a portion on the side of the outer peripheral surface 103a becomes lower in height, as shown in FIG. 9. The end surface 109a and peripheral surface 109b of the recess 109 become adhesion surfaces. On the other hand, the flange 105 is in the form of a disc with a circular opening at the central portion. As shown in FIG. 9, the inner peripheral surface 105b of the flange 105 and the radially inner portion of the inside flange surface 105a become adhesion surfaces.

In the adhesion between the hub 103 and the flange 105, a predetermined amount of adhesive is supplied to the adhesion surface of the hub 103 and/or the adhesion surface of the flange 105 by supply means such as a dispenser, etc. While the two are being positioned, the inner peripheral portion of the flange 105 is fitted and assembled on the recess 109 of the hub 103. Then, the inner peripheral surface 105b of the flange 105 and the peripheral surface 109b of the recess 109 of the hub 103 are adhered at a surface parallel to the axis of rotation of the hub 103. Furthermore, the end surface 109a of the recess 109 of the hub 103 and the radially inner portion of the flange surface 105a are adhered at a surface perpendicular to the rotation axis of the hub 103.

Similarly, in the third embodiment, at least one of the adhesion surfaces in the adhesion portion between the end surface 109a of the recess 109 of the hub 103 and the radially inner portion of the flange surface 105a of the flange 105, and/or at least one of the adhesion surfaces in the adhesion portion between the peripheral surface 109b of the recess 109 of the hub 103 and the inner peripheral surface 105b of the flange 105, may be roughened so that adhesive strength by an adhesive is enhanced, as occasion demands.

According to the third embodiment of the present invention, as with the aforementioned embodiment, the hub 103 and the flange 105 are joined by an adhesive. Therefore, the third embodiment likewise has the following advantages: they can be uniformly adhered over the whole periphery without giving rise to deformation in the flange 105; the rotational deflection of the flange 105 is slight; the lateral fluctuation in magnetic tape being transported is also slight; and the high-density requirement can be met.

In addition, high adhesive strength is obtained by joining the hub 103 and the flange 105 at two surfaces perpendicular to each other. Furthermore, a stepped portion may be formed in the recess 109 of the hub 103.

Note that in the second and third embodiments, the adhesion surface, in addition to being provided continuously on the whole periphery, may be formed into a discontinuous shape having a groove partially. In this case, an excess adhesive can be more effectively prevented from flowing in the groove and overflowing from the adhesion surface to the outside.

In addition to the second and third embodiments, adhesion using an adhesive can also be performed on the conventional reels shown in FIGS. 10 to 14, by changing the rigidly attached portion between the hub and the flange into a configuration for adhesion.

While certain representative embodiments and details have been shown for the purpose of illustrating the present invention, it will be apparent to those skilled in this art that various changes and modifications may be made without departing from the scope of the invention hereinafter claimed.

What is claimed is:

1. A single reel of a magnetic tape cartridge in which the reel with magnetic tape wound thereon is rotatably housed in a cartridge case, a magnetic metal plate being molded integrally on a reel bottom surface by insert molding;

said metal plate being formed into an annular shape having a central hole; and in a reel bottom wall closing said central hole of said metal plate with resin injected from a gate at the center of said central hole of said metal plate when said insert molding is performed, a recess being formed between a gate trace at the center portion of said bottom wall and an inner peripheral surface of the central hole of said metal plate.

2. The reel as set forth in claim 1, where said recess is formed into the shape of a circumferential groove by an annular protruding portion provided in a metal mold.

* * * * *